(Model.)
2 Sheets—Sheet 1.
D. RAWL.
COTTON PICKER.
No. 266,884. Patented Oct. 31, 1882.
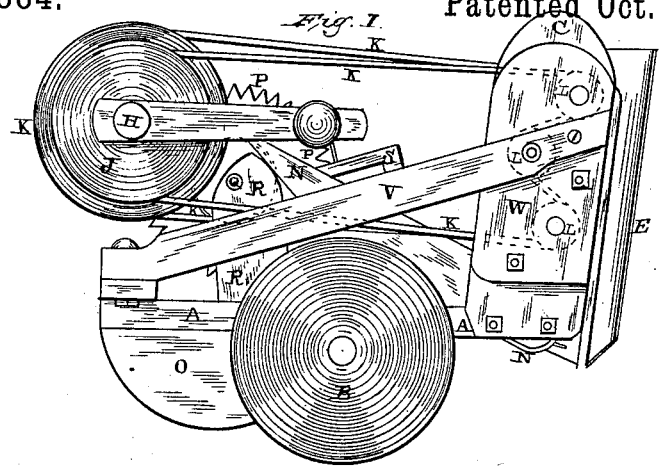
Fig. 1.
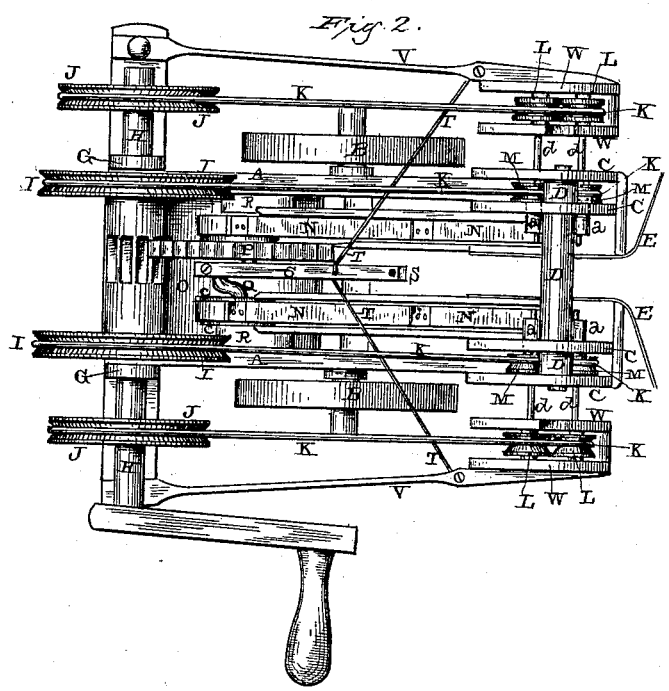
Fig. 2.
Witnesses:
J. C. Clark.
W. H. Kern
Fig. 3.
Fig. 6.
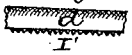
Inventor:
David Rawl,
per
F. A. Lehmann,
Attorney.

(Model.)

2 Sheets—Sheet 2.

D. RAWL.
COTTON PICKER.

No. 266,884.

Patented Oct. 31, 1882.

Witnesses:
J. E. Clark.
W. H. Kern.

Inventor,
David Rawl
per
F. A. Lehmann,
Attorney.

UNITED STATES PATENT OFFICE.

DAVID RAWL, OF BATESBURG, SOUTH CAROLINA.

COTTON-PICKER.

SPECIFICATION forming part of Letters Patent No. 266,884, dated October 31, 1882.

Application filed August 14, 1882. (Model.)

*To all whom it may concern:*

Be it known that I, DAVID RAWL, of Batesburg, in the county of Lexington and State of South Carolina, have invented certain new and useful Improvements in Cotton-Pickers; and I do hereby declare the following to be a full, clear, and exact description of the invention, such as will enable others skilled in the art to which it pertains to make and use it, reference being had to the accompanying drawings, which form part of this specification.

My invention relates to an improvement in machines for picking cotton; and it consists, first, in a series of spindles which are serrated on one side and provided with a flange, and which spindles are made to revolve at the same time that they are made to move in and out from the center; second, in the combination of a series of spindles which have both an endwise and a rotary motion, and suitable mechanism for operating them, endless carriers for conveying the cotton, and a receptacle into which the cotton is dropped as the machine is moved along on wheels, all of which will be more fully described hereinafter.

Figure 4:
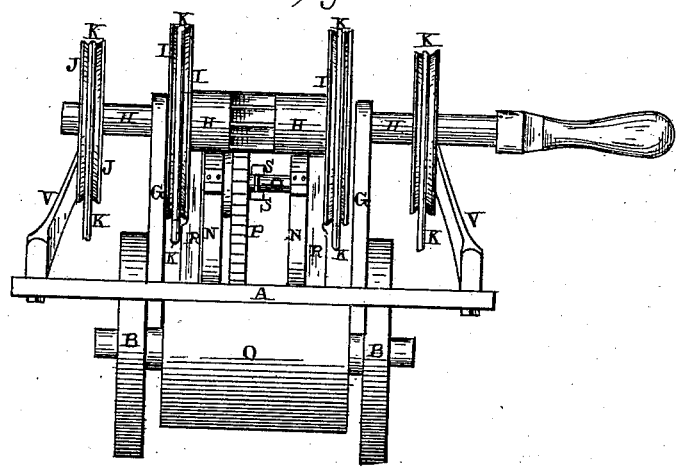
Figure 5:
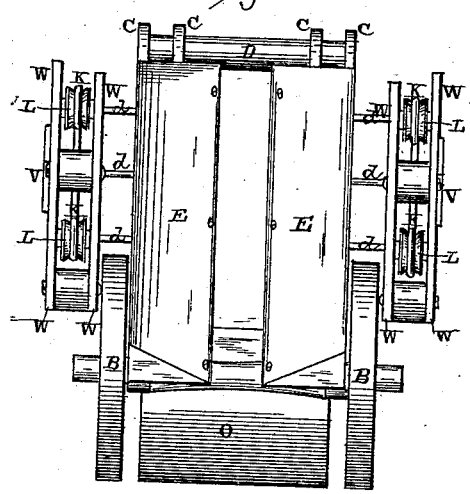

Figure 1 is a side elevation of my invention. Fig. 2 is a plan view of the same. Figs. 3 and 6 are detached views of one of the spindles. Figs. 4 and 5 are end views.

A represents a suitable rectangular frame, which is nicely balanced upon the driving-wheels B. Upon the front end of this frame are secured the four stationary standards C, which are united together at their upper ends by the cross rod or bar D. In between these standards are placed the usual guides, E, which catch the cotton stalks or branches and guide them in to where the cotton-picking devices are to operate upon the bolls. Through the center of the frame is left the usual opening, so that the machine can be driven along over the top of the row, and thus have the plants pass through the center of the machine in the usual manner.

Mounted upon the rear end of the frame are the two standards G, in which the driving-shaft H is journaled. This driving-shaft is provided with two large pulleys, I, and two smaller pulleys, J, all four of which are grooved, and around which pass the driving cords or bands K. The bands from the smaller pulleys pass back and forth around the pulleys L, which are placed upon the outer ends of the spindles, while the bands from the larger pulleys pass back and forth around another series of pulleys, M, arranged on a line with the outer series, and through which the spindles pass. These pulleys have sleeves $a$ formed upon their inner sides, and these sleeves serve to force off any of the cotton which may have been caught by the spindles as they are moving backward. As the spindles are moving inward toward the center of the machine, so as to operate upon the cotton, these pulleys M serve simply as guides through which the spindles pass; but when the spindles are retracted they prevent any of the cotton from clinging to the spindles.

In between the guides which direct the limbs of the plants in position to be operated upon and the standards in which the spindles are journaled there is sufficient space left for the cotton to drop freely down upon the endless belts or carriers N, which carry the cotton backward toward the operator and deposit it in the receptacle O, formed in the rear part of the frame for that purpose. These carriers are operated by means of the spur-wheel P, which is secured to the cranked shaft Q, journaled in the standards R, and which spur-wheel meshes with suitable teeth or gearing upon the driving-shaft. As the cranked shaft revolves it not only operates the endless belts or carriers which pass around pulleys $c$, which are secured to it, but the crank also operates the pitman S, which extends toward the front end of the machine.

Secured to the pitman near its front end are the two connecting-rods T, which have their outer ends fastened to the spring-arms V, which are rigidly secured at their rear ends, one on each side, upon the top of the rear cross-bar of the frame. Secured to the inner side of the front end of these spring-arms are the vertical standards W, in between which the pulleys L, which operate the spindles, are journaled. The front ends of the spring-arms V are drawn inward by the connecting-rods T, as shown in Fig. 1, for the purpose of forcing the spindles $d$ in through the branches of the cotton-plants while the pitman S is being drawn backward. As soon as the crank begins to force the pitman forward the spring-arms V begin to spring outward, so as to retract the spindles. As the forward ends of the spring-arms are drawn inward they move the two standards W, which are secured to the front end of each spring-arm, inward toward the outer sides of the standards C until the standards W strike against the standards C. When the spring-arms V are drawn inward the spindles $d$ are forced through their guiding-pulleys M, and through openings made in the guides E, between which the cotton is held, and these spindles then operate upon the bolls, so as to extract the cotton. The cotton adheres to the spindles, on account of their peculiar shape, until the springs begin their outward movement, when the guiding-pulleys through which the spindles pass serve to force the cotton off and to drop it upon the endless carriers. Each one of the spindles $d$ has a flange or shoulder, I', formed upon one side, which extends out any suitable distance from the side of the spindle, and this shoulder is serrated, as shown, so as to cause the spindle to take hold of the cotton.

This machine will be evenly balanced upon the wheels, so that the operator can catch hold of the rear end of the frame with one hand and guide the machine in any direction, while he turns the crank with the other. This machine may be operated by power, but is specially adapted to be moved along through the field by a single person.

Having thus described my invention, I claim—

1. In a machine for gathering cotton, a series of endwise-moving spindles which have a serrated shoulder formed upon one side, in combination with a mechanism for revolving them and a series of cleaning devices, substantially as shown.

2. In a cotton-picker, the combination of two series of endwise-moving and serrated spindles with means by which they are thrust into the cotton-plants from opposite sides, cleaning devices, a mechanism for revolving them, the spring-arms V, connecting-rods, pitman, and cranked driving-shaft, substantially as described.

3. The combination of the spring-arms having a series of revolving spindles connected to their front ends, the connecting-rods, the pitman, and the cranked shaft, whereby the spindles are moved back and forth through suitable guides to and from the center of the machine, substantially as set forth.

4. In a cotton-picker, the combination of two series of endwise-moving and serrated spindles, two series of pulleys for revolving them, and two series of revolving pulleys provided with the cleaning devices $a$, through which the spindles pass, substantially as specified.

In testimony whereof I affix my signature in presence of two witnesses.

DAVID RAWL.

Witnesses:
JOHN WELLS JONES,
N. M. JONES.